Patented May 18, 1937

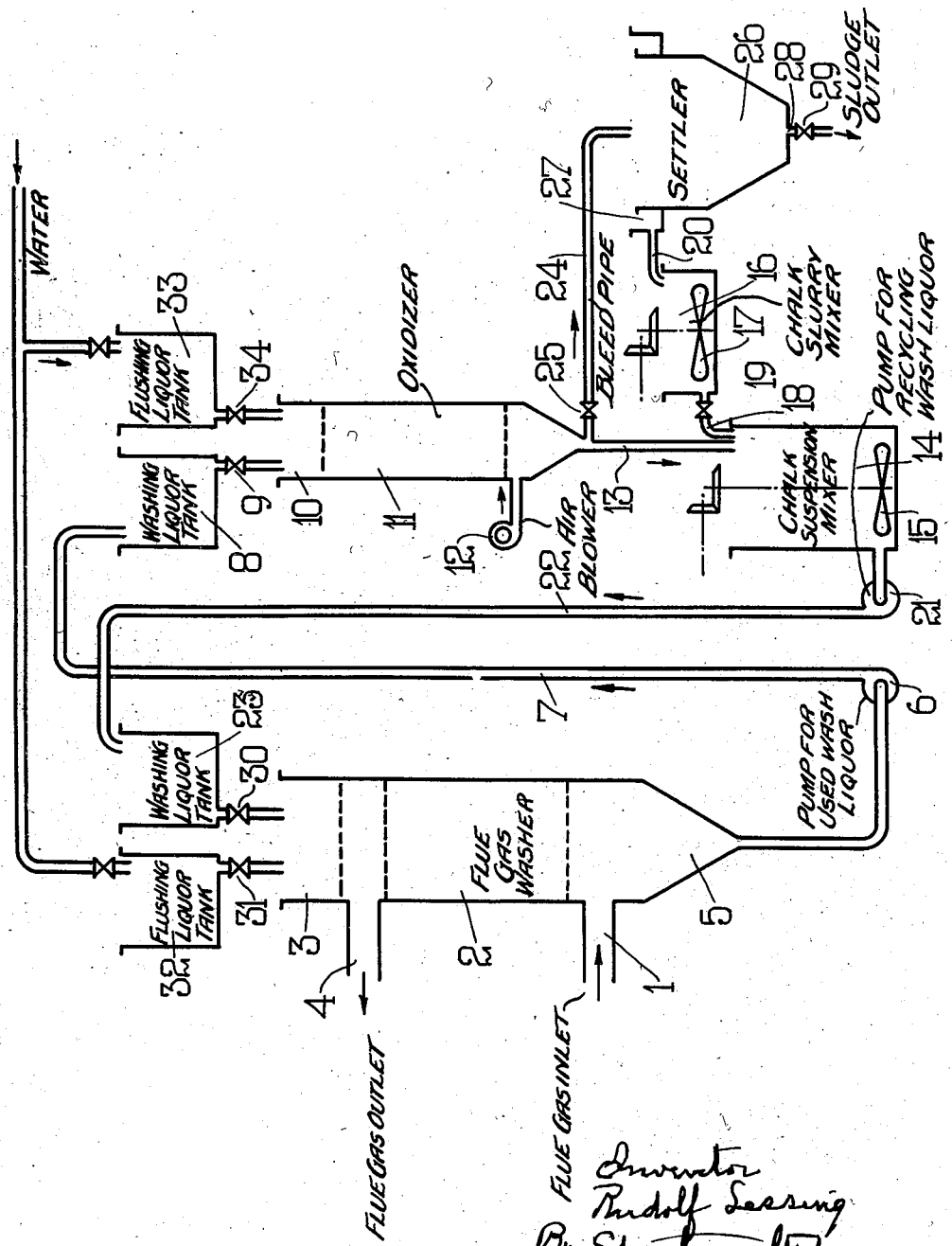

2,080,779

UNITED STATES PATENT OFFICE 2,080,779

PURIFICATION OF COMBUSTION GASES

Rudolf Lessing, London, England, assignor to Imperial Chemical Industries Limited, a corporation of Great Britain Application March 16, 1934, Serial No. 715,945
In Great Britain March 17, 1933

19 Claims. (Cl. 23—2)

This invention relates to the purification of combustion gases and in particular to improvements in processes and apparatus designed to remove oxides of sulphur from such gases.

The objects of the invention are to avoid or minimize the formation and adhesion of solid deposits on plant surfaces with which aqueous washing liquors may be brought into contact, and to provide new or improved processes and apparatus for this purpose.

It has been observed that when combustion gases are brought into contact with aqueous washing liquors, calcium sulphate is formed in solution. In the case where washing liquors not containing compounds of calcium are employed, the calcium appears to be derived from the flue dust carried by the gases. In the case where the washing liquors contain compounds of calcium, for example when hard water is employed or when aqueous suspensions of calcium hydroxide or calcium carbonate are used as neutralizing agents, a further quantity of calcium compounds is thereby brought into contact with the gases. While it is true that in most cases the oxides of sulphur in the gases are mainly present as sulphur dioxide, some or all of this compound or of the calcium sulphite formed therefrom may be oxidized during the washing of the gases by the excess of oxygen contained therein so that calcium sulphate is produced.

It has been found that in such processes for purifying combustion gases the washing liquors used are liable to give rise to the adhesion of solid deposits on exposed plant surfaces and these deposits may cause serious obstruction. In particular when the washing liquors are caused to flow over solid surfaces such as rods, baffle plates, tubes or tower packings of any kind while being exposed to the combustion gases a growth containing calcium sulphate dihydrate appears on such surfaces. Such formation of deposits, which may consist wholly of crystalline calcium sulphate dihydrate or of particles of other solids cemented together by this material, is particularly noticeable when the washing liquors are used cyclically (i. e. when they, or at least the aqueous portion thereof, are brought repeatedly into contact with the gases).

I attribute this to the tendency towards the production of supersaturated solutions which is exhibited by calcium sulphate when produced by the interaction of sulphur trioxide or of sulphur dioxide and oxygen with lime or calcium carbonate. I have found this tendency to form supersaturated solutions to persist when crystallization nuclei of calcium carbonate or of calcium sulphite or flue dust are present in the liquid and careful investigation has shown that crystallization takes place slowly even in the presence of quite substantial amounts of calcium sulphate. It follows, therefore, that even when working with somewhat turbid liquids there is a serious danger of deposits forming on exposed surfaces of the plant due to crystallization of calcium sulphate dihydrate from supersaturated solution.

I have now made the discovery that although seeding has some effect, this is in the ordinary way too slow for practical purposes, and I have further found that the difficulties arising through the tendency of calcium sulphate to form supersaturated solutions can be greatly minimized if a large excess of solid calcium sulphate dihydrate is suspended in the liquid. Materials such as calcium sulphite or calcium carbonate or flue dust may have a certain though a much less pronounced effect.

Preferably the aqueous washing medium contains at least 5% by weight of suspended calcium sulphate dihydrate, a quantity very largely in excess of that dissolved therein, either in the normally saturated or supersaturated solution. It may amount to as much as 10% by weight. The expression "large excess" when used herein is to be construed with reference to the normal solubility in water. The quantity employed should be sufficient to ensure substantially complete crystallization of calcium sulphate in solution in excess of the amount required for normal saturation within the time available, i. e. in the case of a cyclic process before the washing medium is again brought into contact with the gases containing oxides of sulphur. Thus a washing medium which contains 5% by weight of suspended calcium sulphate dihydrate has been found to reassume substantially normal saturation within one minute of being brought out of contact with such gases. In spite of the large surface thus afforded by the solid particles of calcium sulphate dihydrate on which crystallization may be induced, some formation and adhesion on plant surfaces of deposits containing calcium sulphate dihydrate may still occur and these surfaces are therefore preferably flushed periodically as hereinafter described.

When lime is used as the neutralizing agent in a cyclic process deposits of a different kind may be caused by the precipitation of calcium carbonate produced by interaction of free calcium hydroxide with any calcium bicarbonate which may be formed in the washing liquid by the carbon dioxide in the combustion gases. This interaction, which results in scale formation, can be avoided by using calcium carbonate instead of lime as the neutralizing agent, and this is therefore preferred.

It is believed that when the washing solutions are brought into contact with a solid surface there exists, in contact with the solid surface, a film or layer of solution which is relatively stagnant as compared with the bulk of the washing liquor flowing over the solid surface and may become supersaturated with respect to calcium sulphate at the temperature of such solid surface. I have found that the adhesion of crystalline deposits to the solid surface, over which the liquors are caused to flow, can be prevented by periodically removing this relatively stagnant layer of solution from such surfaces. This can be accomplished by periodically flushing or washing these surfaces with a flow of liquid containing little or no calcium sulphate, for example water alone. A higher rate of flow than that of the washing liquors is desirable in order to disturb and remove the layer of liquor in contact with the solid surfaces. Such flushing or washing may be performed at wide intervals of, for example, one hour or more.

The amount of liquid required to flush the surfaces is small as compared with the amount of washing liquor normally passing over the surfaces. Such flushing liquid therefore can in many cases be furnished by the make-up water normally required in a cyclic process. Thus an aqueous medium in which calcium hydroxide or calcium carbonate is suspended may be used cyclically and the water employed for flushing may comprise the whole or a part of the make-up water required to replace water withdrawn from the cycle with deposited solid or lost by evaporation or otherwise.

The invention may be put into practice by employing a suspension of calcium sulphate dihydrate as a body of circulating liquor in which lime or more desirably calcium carbonate is added and from which calcium sulphate and calcium sulphite, in quantities equivalent to the amount of oxides of sulphur absorbed, are removed together with flue dust or other solids taken up from the combustion gases. Such removal is preferably effected by bleeding off a quantity of the suspension and separating therefrom an amount of these solids corresponding in quantity to the "make". The liquid from which the suspended material has been separated may then be returned into circulation, and it is important to note that the separation need not be very sharp but a fairly rough decantation will suffice since the circulating liquid is required to contain an excess of suspended matter. Accordingly, separation of the "make" of calcium sulphate, calcium sulphite or other solids is facilitated to an extraordinary extent, and very small apparatus will suffice. Moreover, it has been found that the settling rate of calcium sulphate dihydrate substantially exceeds that of calcium carbonate, so that it is readily possible to separate calcium sulphate dihydrate from the suspension whilst leaving unused calcium carbonate in the liquid to be returned into circulation.

Only in those cases where the accumulation of soluble salts derived from the minor constituents of the "make-up" water or from the flue dust demands a discard of liquid beyond that associated with the sludge settled out from the bleed, or where the discharge of suspended solid matter into water courses is not permissible, need a corresponding portion of the bleed be clarified.

In cases where no lime or calcium carbonate is added to the washing liquid and where the "make" of calcium sulphate, resulting from the calcium compounds contained in the flue dust or in the water employed, is not sufficient to maintain the required excess, the requisite amount of calcium sulphate dihydrate may be recovered from the bleed by separating calcium sulphate dihydrate from the other solids by means of elutriation or differential sedimentation and returned into circulation.

The apparatus employed in the present invention preferably comprises a gas washer, an oxidizer for washing medium and a mixing vessel connected together in a closed cycle, means for bleeding off and settling a portion of the washing medium after it has passed through the oxidizer and means for returning a liquid portion of the settled bleed to the cycle.

Alternatively or in addition the apparatus for the purification of combustion gases by means of aqueous washing media may include means for temporarily arresting the flow of washing medium through the gas washer or the oxidizer or both at predetermined intervals of time and for replacing it by a flow of flushing liquor such as water.

In carrying out the process of the present invention a suspension of calcium hydroxide or calcium carbonate may be caused to flow over solid surfaces in contact with the gases to be purified and at intervals of, for example, one hour, such surfaces may be flushed with water preferably at a higher rate of flow for a short time of, say, 10 seconds. The velocity of flow of the flushing water depends on the type and arrangement of the solid contact surfaces and on the general operating conditions. I have found a rate of flow of about 10 gallons per hour and per inch of mean perimeter of the transverse section through the solid surfaces, to give the desired result, but this rate may be varied according to local conditions. The rate of flow of flushing water is, therefore, considerably higher than the rate of flow at which the solid surfaces are usually irrigated with the washing liquor.

I have further found that an amount of water equal to about 1% of the washing water will suffice for thus flushing the surfaces from time to time. This is no more than would normally be required as a make-up to compensate for losses by evaporation, removal with solid deposits and the like.

Instead of flushing all the surfaces in a gas washing plant simultaneously with water, say at intervals of one hour, I prefer to subdivide them for this purpose into a number of units or sections and to flush these consecutively. The operation is, therefore, spread more evenly over a given time, with the result that the purification of the combustion gases is little affected by the momentary deficiency of the calcium compounds in a relatively small portion of the plant, that the volume of washing liquor in circulation is kept more nearly constant, that the back pressure due to the higher rate of water flow through a unit or section during the flushing period is equalized over the units or sections through which the washing liquor passes at the normal rate of flow, and that a smaller pipe and storage system is required for the supply of flushing water. Automatically controlled devices may be used for cutting off periodically at predetermined times and for definite periods the supply of washing liquor to the various individual units or sections, and to bring into action the supply to such units or sections of flushing water at the requisite rate in a rotational system.

It may, however, happen in certain cases that the amount of water which has to be added as make-up will not suffice for adequate flushing of the surfaces or that certain of these, e. g. the internal surfaces of valves and pipes, may not be readily accessible for such flushing or that the time which elapses between successive flushings may be long enough to permit supersaturation and adhesion of crystalline deposits to take place. It is therefore preferable in such cases also to maintain in suspension a large excess of calcium sulphate dihydrate.

It will be apparent that the invention is not limited to the use of suspensions of calcium hydroxide or calcium carbonate but may equally be applied to processes in which water is used as the washing medium. Moreover, the invention is not limited to processes in which the washing liquors are caused to flow over surfaces in contact with the combustion gases. It may be applied with advantage to processes in which the washing liquor is sprayed into a vessel in which it comes into contact with the combustion gases. The process of the present invention then prevents blockage of the spraying jets and pipes of the apparatus.

One suitable form of apparatus for carrying out the process of the present invention is designed to enable the flow of washing liquor to be cut off and replaced by a flow of flushing liquid which may be pure water and may be fed at a higher rate of flow than the washing liquor. One important feature of the apparatus consists in arranging for the flushing liquid to pass through the same inlet or inlets as the washing liquor and providing means, preferably interconnected, to enable the washing liquor to be shut off and the flushing liquid to be turned on.

The method of avoiding formation and adhesion of deposits by periodical flushing is particularly applicable when the washing liquor is fed into the gas washer or other portion of the apparatus from a head tank having multiple orifices in its bottom. In this case I provide two storage tanks, arranged above the head tank, with valve controlled outlets leading thereto. One of these tanks is filled with water and its outlet is normally closed while the washing liquor is passing through the other storage tank into the head tank. When the surfaces in the apparatus below the head tank are to be flushed, the outlet valve of the washing liquor storage tank is closed. This allows the washing liquor to accumulate in its storage tank, and the level of liquid in the head tank to fall. When the liquor level has descended so far as just to cover the orifices in the bottom, the outlet valve of the water storage tank is opened and water is allowed to pass through the head tank and to flush the surfaces within the apparatus therebeneath. At the end of the flushing period the operations are reversed. The dimensions of the outlet valves and pipes of the two storage tanks and the depth which the liquid in the head tank is allowed to assume when alternatively washing liquor or flushing water are being applied, are preferably so arranged as to give the requisite rate of flow with either liquid.

As a rule the gases of combustion contain free oxygen, and this may effect oxidation of some or all of the calcium sulphite formed from the sulphur dioxide. As hereinbefore stated it is desirable, when an excess of calcium sulphate dihydrate is maintained in suspension in the washing liquor used in a cyclic process, that some portion be bled off from the washing liquor in circulation containing calcium sulphate dihydrate, calcium sulphite, flue dust and other solids or dissolved salts, corresponding in quantity to the "make". I have found that when the oxidation of calcium sulphite during contact with the combustion gases and during handling and reasonable exposure of the washing liquor to air in tanks and the like is incomplete, such withdrawal by bleeding off solids from the washing liquor in circulation may cause a steady diminution of the requisite excess of calcium sulphate dihydrate and an undue accumulation of calcium sulphite which has little effect in counteracting supersaturation. I therefore prefer to provide means for ensuring that substantially all of the calcium sulphite in the washing liquor is oxidized to calcium sulphate as soon as possible after the liquors come out of contact with the gases. Preferably therefore the liquors leaving the gas washing apparatus are passed into or through an oxidizer wherein they are brought into intimate contact with air. The amount of air required varies according to the design and operation of the oxidizer, but I have found that a volume equal to less than 2% of the volume of the combustion gases usually suffices for substantially complete oxidation. Known oxidation catalysts may be employed, if desired, to promote oxidation, but there is generally no need to add these.

The oxidizer may consist of a scrubbing apparatus filled with tower packing preferably of corrosion-resisting material. This may be of much smaller dimensions than the corresponding gas washing apparatus, and periodical flushing may be applied to it in the manner hereinbefore described.

One suitable mode of practicing the invention will now be described with reference to the accompanying diagrammatic drawing.

Flue gases from a boiler furnace pass by way of inlet 1 into a gas washing tower 2 which they ascend in counter-current to washing liquor fed in from a head tank 3 through suitable orifices. The tower 2 may be arranged in any known manner to provide adequate contact of the washing liquor with the gases. The gases after being washed escape at 4 and may be passed to the usual chimney stack.

The washing liquor after contact with the gases collects in the bottom 5 of the tower 2 and is delivered thence by pump 6, pipe 7 and by way of a storage tank 8 and valve 9 into a head tank 10 having suitable orifices and thence to an oxidizer in the form of a tower 11 which may also be arranged in any known manner to provide adequate contact of the liquor with a counter-current of air blown in by fan 12. The surfaces within the oxidizer 11 are most suitably formed of or covered with corrosion-resisting material. From the oxidizer 11 the washing liquor passes by pipe 13 to a mixing vessel 14. Here it is mixed with the requisite amount of calcium carbonate in the form of chalk by means of a rotating mixing device 15, such as a rotary paddle.

The calcium carbonate is preliminarily made into a slurry in a supplementary mixer 16 provided with a mixing device 17, which may also be a rotary paddle, and with an outlet 18 controlled by regulating device 19. The calcium carbonate which is fed to 16 from a hopper (not shown) is disintegrated by the paddle 17, is made into a slurry with liquor entering by pipe 20 and is passed into the mixer 14 as required.

The washing liquor from the mixer 14, having been oxidized in the oxidizer 11 and augmented by calcium carbonate and liquor added from pipe 18 is delivered by pump 21 and pipe 22 through the storage tank 23 to the head tank 3.

A part of the liquor collecting in the bottom of the oxidizer 11 is continuously or intermittently withdrawn through pipe 24 provided with valve 25. Through pipe 24 it passes to a settling tank 26 having a launder 27 and a bottom outlet 28 controlled by valve 29. More or less clarified liquor overflows into the launder 27 and is passed by pipe 20 to the mixer 16. Deposited solids in the form of sludge are withdrawn through outlet 28 continuously or intermittently. The water content of the sludge, which may be 50%, may be further reduced by filtration. A sludge containing even 50% of water is, however, poor in water as compared with the original suspension, i. e. the washing liquor.

When the tower 2 is to be flushed, valve 30 is closed and washing liquor is allowed to accumulate in storage tank 23. As soon as the liquor level in head tank 3 has descended to a suitable point as hereinbefore indicated, valve 31 is opened and clean water is run from storage tank 32 into head tank 3 at a suitable rate. When a sufficient amount of water has been fed into head tank 3, valve 31 is closed, the water level in head tank 3 is again allowed to descend and valve 30 is opened. When oxidizer 11 is to be flushed, a similar sequence of operations is carried out, using liquor storage tank 8 with valve 9 and water storage tank 33 with valve 34.

The total volume of liquid in circulation should be kept reasonably constant. Some variations in volume will, however, occur owing to its reduction by evaporation and by the discharge of water with the sludge, and owing to its increase by the addition of flushing water. The mixing tank should be large enough to accommodate these variations which, however, can be minimized by a suitable subdivision of the washing plant into units or sections as hereinbefore mentioned and by correlating the addition of flushing water and the withdrawal of sludge.

The washing liquor which is circulated through the system consists of a saturated solution of calcium sulphate in water containing approximately 200 parts of calcium sulphate ($CaSO_4$) per 100,000 in which are suspended about 200 parts of calcium carbonate ($CaCO_3$) and about 5,000 parts of calcium sulphate dihydrate ($CaSO_4.2H_2O$) per 100,000. Small quantities of calcium bicarbonate, calcium sulphite and calcium bisulphite may be found to be present in the circulating liquors but the last-named should not, as a rule, be permitted to exceed 20 parts per 100,000. If this figure is exceeded, calcium carbonate should be added at a correspondingly increased rate until such excess disappears.

I declare that what I claim is:—

1. A process for the purification of combustion gases containing oxides of sulphur which consists in bringing such gases into contact with an aqueous washing medium containing in suspension a calcium compound adapted to react with and combine said oxides of sulphur, withdrawing said aqueous medium from contact with said combustion gases, removing from the aqueous medium so withdrawn a portion rich in suspended solid and poor in aqueous liquor, regenerating the aqueous medium which is to be brought into contact with the gases by adding to it a calcium compound adapted to react with and combine said oxides of sulphur, and periodically flushing plant surfaces contacted by said aqueous washing media with a quantity of water substantially equivalent to that removed in said portion rich in suspended solid.

2. A process for the purification of combustion gases containing oxides of sulphur which consists in bringing such gases into contact with an aqueous washing medium containing in suspension a calcium carbonate adapted to react with and combine oxides of sulphur, withdrawing said aqueous medium from contact with said combustion gases, removing from the aqueous medium so withdrawn a portion rich in suspended solid and poor in aqueous liquor, regenerating the aqueous medium which is to be brought into contact with the gases by adding to it a calcium carbonate adapted to react with and combine said oxides of sulphur, and periodically flushing plant surfaces contacted by said aqueous washing media with a quantity of water substantially equivalent to that removed in said portion rich in suspended solid.

3. A process for the purification of combustion gases containing oxides of sulphur which consists in bringing such gases into contact with an aqueous washing medium containing in suspension calcium carbonate and at least 5% of solid calcium sulphate dihydrate, withdrawing aqueous medium from contact with said combustion gases, removing from the aqueous medium so withdrawn a portion rich in suspended solid and poor in aqueous liquor, and regenerating the aqueous medium which is to be brought into contact with the gases.

4. A process for the purification of combustion gases containing oxides of sulphur, which consists in bringing such gases into contact with an aqueous washing medium containing in suspension a calcium compound adapted to react with and combine said oxides of sulphur and at least 5% of solid calcium sulphate dihydrate, withdrawing at least a part of said aqueous medium from contact with said combustion gases, removing from at least a part of said aqueous medium so withdrawn by a process which includes settling a proportion of suspended solid equivalent to the quantity of oxides of sulphur and dust removed from the combustion gases, and regenerating the aqueous medium which is to be brought into contact with the gases by adding to it a corresponding proportion of a calcium compound adapted to react with and combine the oxides of sulphur.

5. A process for the purification of combustion gases containing oxides of sulphur which consists in bringing such gases into contact with an aqueous washing medium containing in suspension calcium carbonate and at least 5% of solid calcium sulphate dihydrate, withdrawing at least a part of said aqueous medium from contact with said combustion gases, removing from at least a part of said aqueous medium so withdrawn by a process which includes settling a proportion of suspended solid equivalent to the quantity of oxides of sulphur and dust removed from the combustion gases, and regenerating the aqueous medium which is to be brought into contact with the gases by adding to it a corresponding proportion of calcium carbonate.

6. Process for the purification of combustion gases containing oxides of sulphur which consists in bringing such gases into contact with an aqueous washing medium containing approximately 5% of solid calcium sulphate dihydrate in suspension, withdrawing such aqueous washing medium from contact with the gases, abstracting a minor portion of the washing liquor so withdrawn, and bringing the major portion of the washing liquor into further contact with combustion gases containing oxides of sulphur.

7. Process for the purification of combustion gases containing oxides of sulphur which consists in bringing such gases into contact with an aqueous washing medium containing approximately 5% of solid calcium sulphate dihydrate in suspension, withdrawing such aqueous washing medium from contact with the gases, abstracting a minor portion of the washing liquor so withdrawn, removing suspended solids from the abstracted minor portion, and bringing the remaining major portion of the washing liquor and the liquor of said minor portion from which suspended solids have been removed into further contact with combustion gases containing oxides of sulphur.

8. Process for the purification of combustion gases containing oxides of sulphur which consists in continuously circulating into and out of contact with such gases an aqueous washing medium containing in suspension a calcium compound adapted to react with and combine said oxides of sulphur and also approximately 5% of solid calcium sulphate dihydrate, bleeding off a minor portion of the circulating washing liquid and subjecting said portion to settling to remove calcium sulphate formed by contact with the flue gases and adding to the circulating liquid further calcium compound adapted to react with and combine oxides of sulphur.

9. Process for the purification of combustion gases containing oxides of sulphur which consists in continuously circulating into and out of contact with such gases an aqueous washing medium containing in suspension calcium carbonate and also approximately 5% of solid calcium sulphate dihydrate, bleeding off a minor portion of the circulating washing liquid and subjecting said portion to settling to remove calcium sulphate formed by contact with the flue gases and adding to the circulating liquid further calcium carbonate.

10. A process for the purification of combustion gases containing oxides of sulphur which consists in bringing such gases into contact with an aqueous washing medium containing in suspension calcium carbonate and approximately 5% of solid calcium sulphate dihydrate, withdrawing said aqueous medium from contact with said combustion gases, bleeding from such aqueous medium a minor portion, regenerating the major portion remaining by adding to it calcium carbonate, dividing said minor portion into a portion rich in suspended solid and a portion poor in suspended solid, combining said portion poor in suspended solid with said major portion and bringing such combined portions into further contact with combustion gases containing oxides of sulphur.

11. A process for the purification of combustion gases containing oxides of sulphur which consists in bringing such gases into contact with an aqueous washing medium containing in suspension a calcium compound adapted to react with and combine said oxides of sulphur and approximately 5% of solid calcium sulphate dihydrate, withdrawing said aqueous medium from contact with said combustion gases, bleeding from said aqueous medium a minor portion, regenerating the major portion remaining by adding to it a calcium compound adapted to react with and combine said oxides of sulphur, dividing said minor portion into a portion rich in suspended solid and a portion poor in suspended solid, combining said portion poor in suspended solid with said major portion and bringing such combined portions into further contact with combustion gases containing oxides of sulphur.

12. A process for the purification of combustion gases containing oxides of sulphur which consists in bringing such gases into contact with an aqueous washing medium containing in suspension a calcium compound adapted to react with and combine said oxides of sulphur and a large excess of solid calcium sulphate dihydrate, withdrawing at least a part of said aqueous medium from contact with said combustion gases, separating said aqueous medium so withdrawn into a portion rich in suspended solid and poor in aqueous liquor, and a portion poor in suspended solid but still containing in suspension a large excess of solid calcium sulphate dihydrate, regenerating said portion poor in suspended solid by adding to it a calcium compound adapted to react with and combine said oxides of sulphur, bringing said regenerated portion into further contact with combustion gases containing oxides of sulphur and periodically flushing plant surfaces contacted by said aqueous washing medium with water.

13. In a process for the purification of combustion gases containing oxides of sulphur which consists in bringing such gases into contact with an aqueous washing medium containing in suspension calcium carbonate and approximately 5% of solid calcium sulphate dihydrate, the step which consists in subjecting the washing medium after contact with the combustion gases and while still containing a large excess of solid calcium sulphate dihydrate in suspension to a process of oxidation to convert calcium sulphite to calcium sulphate.

14. In a process for the purification of combustion gases containing oxides of sulphur by bringing such gases into contact with aqueous washing media containing in suspension a calcium compound adapted to react with and combine said oxides of sulphur, periodically removing the layer of aqueous washing medium which is in contact with plant surfaces by periodically flushing said surfaces with an aqueous washing liquor which is substantially free from calcium sulphate.

15. In a process for the purification of combustion gases containing oxides of sulphur by bringing such gases into contact with aqueous washing media containing calcium carbonate in suspension, periodically removing the layer of aqueous washing medium which is in contact with plant surfaces by periodically flushing said surfaces with an aqueous liquid which is substantially free from calcium sulphate.

16. In a process for the purification of combustion gases containing oxides of sulphur by bringing such gases into contact with an aqueous washing medium containing in suspension a large excess of solid calcium sulphate dihydrate, periodically removing the layer of aqueous washing medium which is in contact with plant surfaces by periodically flushing said surfaces with an aqueous liquid which is substantially free from calcium sulphate.

17. In a process for the purification of combustion gases containing oxides of sulphur by bringing such gases into contact with an aqueous washing medium containing in suspension approximately 5% of solid calcium sulphate dihydrate, the step which consists in periodically flushing plant surfaces contacted by said washing medium with water.

18. In a process for the purification of combustion gases containing oxides of sulphur by bringing such gases into contact with an aqueous washing medium containing in suspension calcium carbonate and a large excess of solid calcium sulphate dihydrate, the step which consists in periodically flushing plant surfaces contacted by said washing medium with water.

19. In a process for the purification of combustion gases containing oxides of sulphur by bringing such gases into contact with an aqueous washing medium containing in suspension calcium carbonate and a large excess of solid calcium sulphate dihydrate, which includes subjecting the washing medium after contact with the gases to a process of oxidation to convert calcium sulphite to calcium sulphate, the step which consists in periodically flushing plant surfaces contacted by said washing medium with water.

RUDOLF LESSING.